Sept. 26, 1939.   T. R. GLENNEY   2,174,240
CLUTCH
Filed Nov. 10, 1937
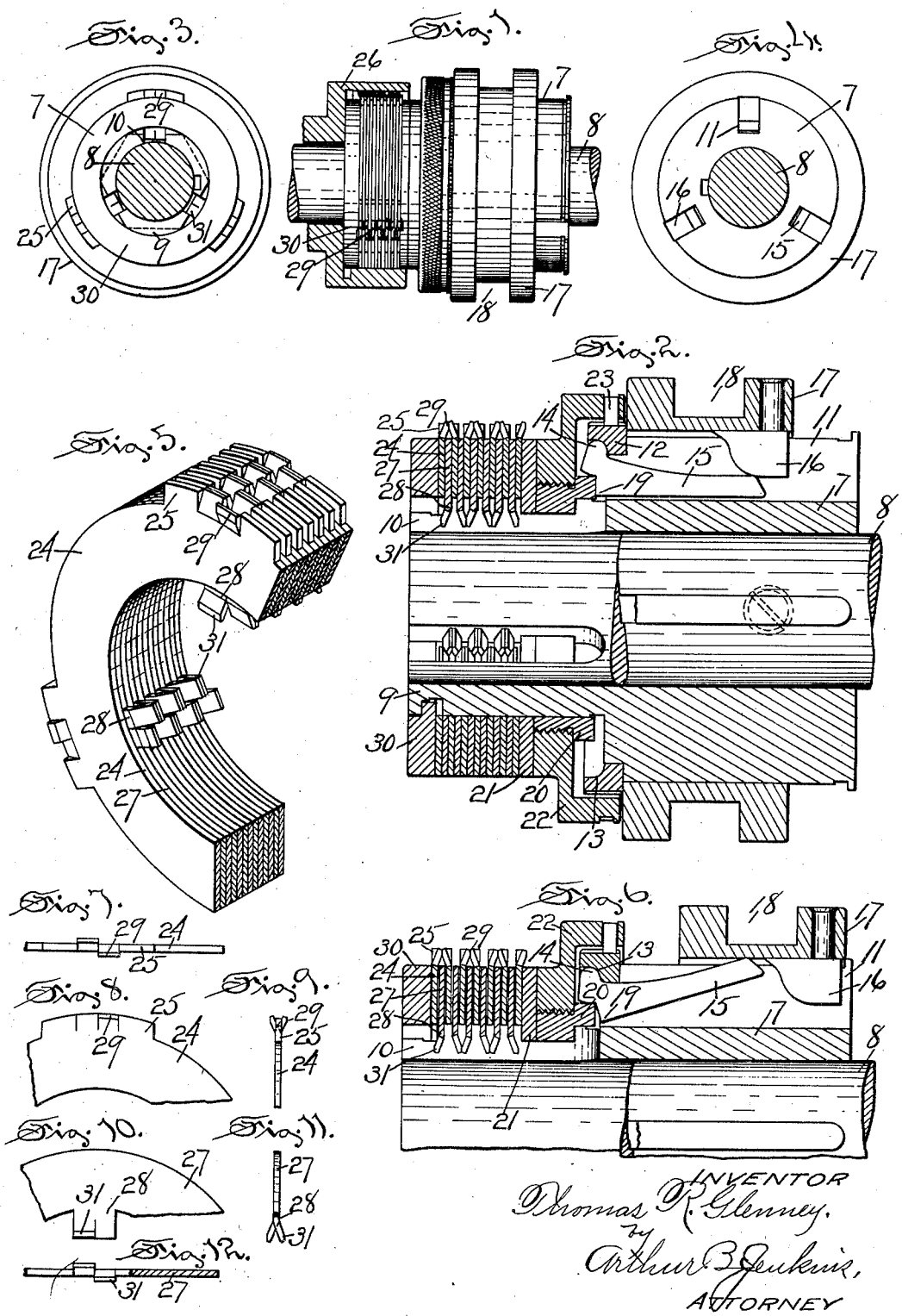
INVENTOR
Thomas R. Glenney.
by
Arthur B. Jenkins,
ATTORNEY Patented Sept. 26, 1939

2,174,240

UNITED STATES PATENT OFFICE 2,174,240

CLUTCH

Thomas R. Glenney, Manchester, Conn., assignor to The Carlyle Johnson Machine Co., Manchester, Conn., a corporation of Ohio Application November 10, 1937, Serial No. 173,804

6 Claims. (Cl. 192—69)

My invention relates to the class of devices which are employed for temporarily connecting a driving and a driven member for operation of the latter by the former, and an object of my invention, among others, is the provision of a device of this class that shall be simple in construction and particularly efficient in operation.

One form of a clutch embodying my invention and in the construction and use of which the objects herein set out, as well as others, may be attained is illustrated in the accompanying drawing in which Figure 1 is a side view of a clutch embodying my invention.

Figure 2 is a view in lengthwise central section through the same, on enlarged scale.

Figure 3 is an end view with the driven member removed.

Figure 4 is an end view looking at the opposite end from that shown in Fig. 3.

Figure 5 is an isometric, perspective view of a section of the clutch disks.

Figure 6 is a view on enlarged scale in central, lengthwise section of a portion of the clutch showing the clutch disks in released position.

Figure 7 is an edge view of a portion of a clutch disk of one of the sets of disks.

Figure 8 is a face view of the same.

Figure 9 is an edge view looking from the right of Fig. 8.

Figure 10 is a view similar to Fig. 8 but of a clutch disk of the other set of disks.

Figure 11 is an edge view of the same.

Figure 12 is a view looking upwardly at the disk as shown in Fig. 10.

It is common practice in the construction of clutches to employ a plurality of flat disks placed one against the other, said disks being arranged in two sets, one set of which is secured to the driving member and the other set of which is secured to the driven member, means being employed for pressing the disks of both sets into tight engagement so that the motion of the driving member is imparted to the driven member. These disks are liberally supplied with lubricant, as oil, which forms a film between the disks, the effect of which is to cause the disks to adhere to each other and prevent them from being readily separated. It is the purpose of my invention to eliminate this objectionable result and to provide means for effecting easy and ready separation of the disks, such structure being shown in the drawing, herein in which the numeral 7 denotes the body of a clutch which is tubular in form for the reception of a driving shaft 8 to which the clutch body is secured. One end 9 of the clutch body is reduced in size and has slots 10 extending inwardly from said end. Grooves 11 are formed in the body 7, extending lengthwise thereof, in the structure herein shown there being three of the slots 10 and three grooves 11. A seating ring 12 is tightly fitted upon the body and has an annular groove 13 within which the heels 14 of clutch levers 15 are fulcrumed, said heels being located in the grooves 11. These levers are operated as by means of cams 16 extending inwardly from an operating sleeve 17 slidably mounted on the body and having an annular groove 18 to receive pins from an actuating lever (not shown) in a manner common to structures of this class and for which reason a showing of said lever is omitted.

Toes 19 of the levers 15 are in close engagement with a clutch ring 20 slidably mounted on the reduced end of the clutch body and in contact with a clutch plate 21 in the form of a ring surrounding the reduced end of said body. A pressure ring 22 is screw threadedly engaged with said clutch ring and has a spring pressed detent 23 engaged with a ribbed and grooved surface on the seating ring 12, this pressure ring being employed to adjust the amount of pressure between the clutch disks to be now described.

These disks are in the form of ring plates fitted upon the reduced end of the clutch body and they comprise two sets of disks, the members of one set being located between the members of the other set. The set comprising the disks 24 have projections 25 extending from their peripheries into grooves formed in the driven member 26 while the disks 27 have projections 28 extending from their inner edges into the slots 10 in the clutch body.

The projections 25 on the peripheries of one set of disks have releasing fingers 29 preferably located adjacent each other and being bent laterally in opposite directions so that they extend over the peripheries of the disks 27 and into contact with similar fingers on disks of the same set located on the opposite sides of the disks 27. Similarly the projections 28 on the disks 27 have spring fingers 31 bent in opposite directions across the inner edges of the disks 24 and into engagement with similar fingers on disks of the same set located on opposite sides of the disks 27.

In operation, movement of the sleeve 17 rocks the clutch levers 15 on their fulcrums, pressing the toes 19 of said levers tightly against the clutch ring 20 and forcing said ring against the clutch plate 21 which in turn is forced against the clutch disks, the latter being backed up by a retaining ring 30 removably secured to the end of the clutch body. As the clutch disks are pressed together to bind them in clutched engagement the spring fingers on the peripheries and on the inner edges of said disks will be forced against each other and they will be pressed backwardly against the tension of their springs, the flat surfaces of the clutch disks being forced tightly against each other. When the disks are released by a movement of the sleeve 17 to release the clutch levers 15 said spring fingers acting against each other will immediately press the clutch disks apart and cause them to be disengaged from each other so that one set of disks may continue to rotate with the driving member without any adherence to the disks of the other set which eventually becomes stationary when the driven member ceases to operate.

It will be found that one of the sets of spring fingers on the edges of one of the sets of disks may be dispensed with if desired, but I prefer to use both sets.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim:

1. In a clutch, a plurality of clutch disks comprising a set all of duplicate construction and reversible a second set each of which spaces apart two disks of the first set, a spring acting releasing finger extending from one of said disks, a spring acting releasing finger of duplicate construction to that first mentioned on another of said disks positioned to receive the pressure of the first mentioned finger and thereby operate to separate said disks and the intermediate disk, and means for forcing said disks into contact.

2. In a clutch, a plurality of clutch disks divided into sets, all the disks of each set being of duplicate construction and reversible a spring acting releasing finger extending from a disk of one of said sets across the edge of a disk of another of said sets, a spring finger of duplicate construction to that first mentioned extending from a disk of the same set as that having the first mentioned spring finger positioned to receive the pressure of said finger, and means for forcing the disks into contact.

3. In a clutch, a plurality of clutch disks divided into two sets and having openings therein, all of the disks of each set being of duplicate construction and reversible spring acting releasing fingers extending from the peripheries of the disks of one set across the peripheries of the disks of the other set and into contact with spring acting releasing fingers of the same form as that of the disks of the same set, spring acting releasing fingers projecting from the edges of the openings in the disks of said other set across the edges of the openings in the disks of the first mentioned set and into contact with spring acting releasing fingers of the same form as that of the disks of the same set, and means for forcing said disks into contact with each other.

4. In a clutch, a plurality of clutch disks divided into two sets, all of the disks of one set being of duplicate construction and comprising projections forming keys, each of the projections being divided to create a space between them, spring fingers projecting in opposite directions laterally of the disk in each space, means for supporting said disks, and means for pressing them together.

5. In a clutch, a plurality of clutch disks divided into two sets, all of the disks of each set being of duplicate construction and separated by a disk of the other set, and all of the disks of each set having pairs of spring fingers located side by side and projecting in opposite directions laterally of a disk of the other set to contact with like spring fingers arranged in the same manner on other disks of the same set, means for supporting said disks, and means for pressing them together.

6. In a clutch, a plurality of clutch disks divided into two sets, all of the disks having central openings and the disks of each set being of duplicate construction, the disks of one set having projections each projection comprising two members spaced apart to form spaced keys, pairs of spring fingers in each of said spaces, pairs of projections extending from the edges of the openings in the disks of the other set, the bases of said projections forming keys and the outer ends being bent in opposite directions to form spring fingers, means for supporting said disks, and means for pressing them together.

THOMAS R. GLENNEY.